Nov. 15, 1932.　　　　C. C. FARMER　　　　1,887,590
FLUID PRESSURE BRAKE
Filed Nov. 14, 1931　　　　2 Sheets-Sheet 1
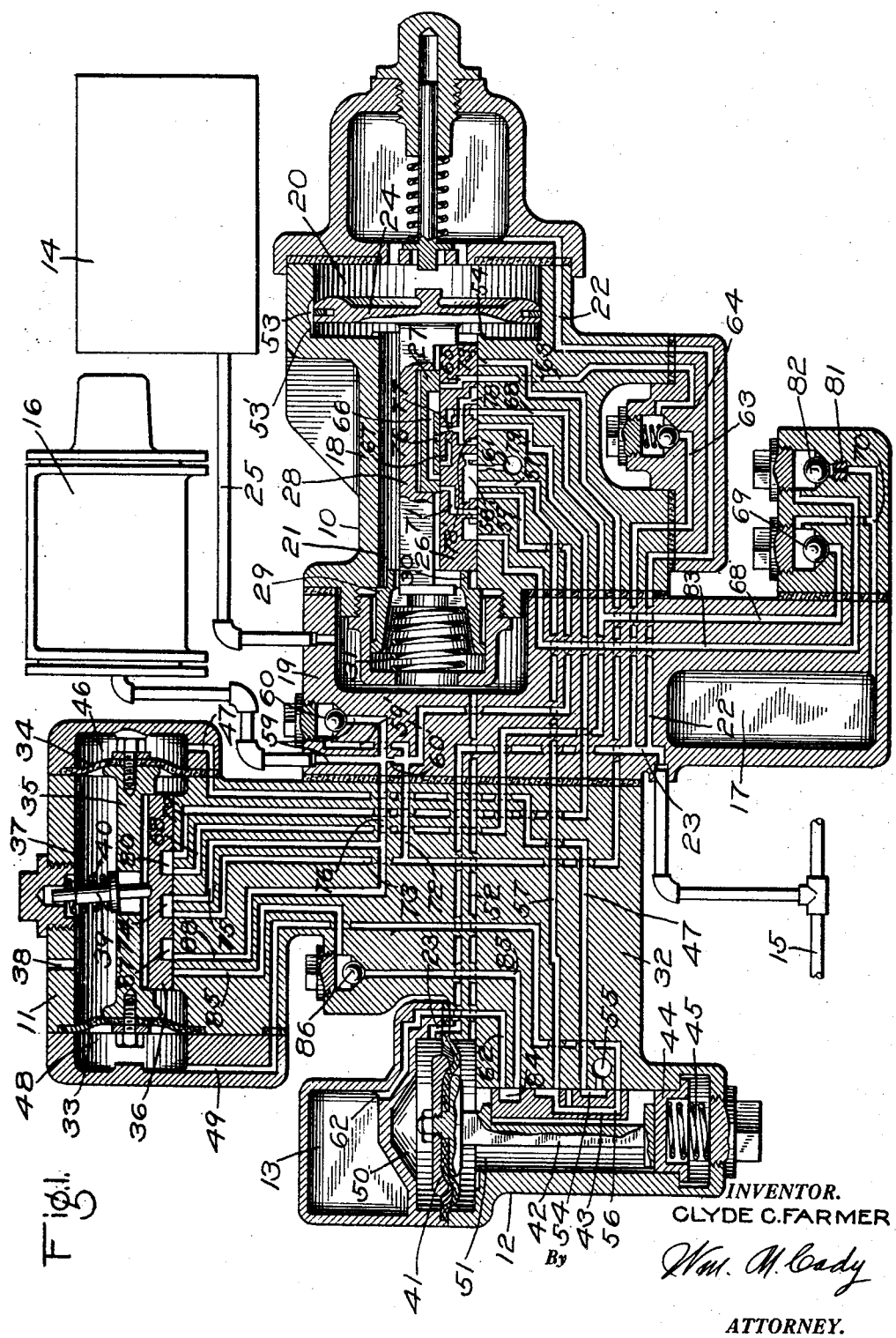
INVENTOR.
CLYDE C. FARMER
ATTORNEY.

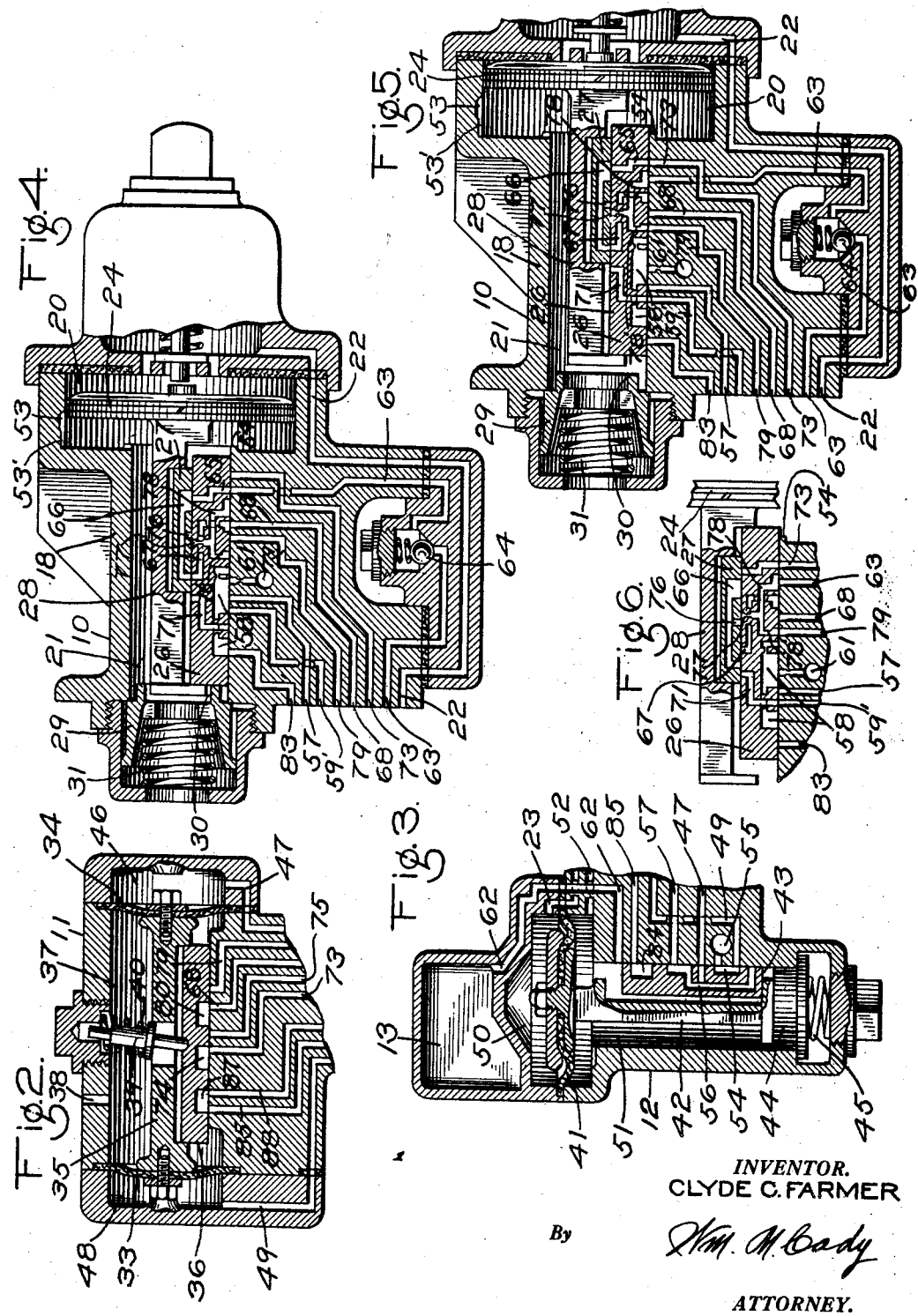

Patented Nov. 15, 1932

1,887,590

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed November 14, 1931. Serial No. 575,029.

This invention relates to fluid pressure brakes, and more particularly to a brake equipment in which the brakes are controlled by varying the pressure in the brake pipe.

The problem of obtaining proper application and release of brakes on trains has been magnified with the increase in train lengths and considerable difficulty has been encountered in providing means for effecting an application or release of the brakes which will prevent severe shocks in the train due to running in or running out of slack.

The primary object of the present invention is the provision of improved means for delaying the build-up of brake cylinder pressure on cars at the head end of the train, so as to prevent severe shocks due to the running in of slack which occurs when the brakes at the head end of the train are forcibly applied in advance of the application of the brakes at the rear end of the train.

In actual service, difficulty has been met in obtaining the desired result, due to the time required to propagate a reduction in brake pipe pressure to the rear end of a long train. This has resulted in the application of the brakes at the head end of the train in advance of those at the rear end of the train, and consequently severe shocks have been imparted to the train.

According to the teachings of the present invention, improved means have been provided for propagating the initial reduction in brake pipe pressure to the rear end of the train to effect a prompt application of the rear brakes and at the same time incorporating means effective at the head end of the train for retarding the build-up of brake cylinder pressure to delay the application of the brakes at the head end of the train.

Another object of my invention is to provide a fluid pressure brake equipment having means for effecting a local reduction in brake pipe pressure in applying the brakes, so as to produce quick serial action, and means for preventing such quick serial action on cars at the head end of the train.

Another object resides in the provision of improved means for effecting a prompt release of the brakes at the head end of the train to prevent severe shocks due to running out of the slack.

Other objects and advantages will appear from the following description of an illustrative embodiment of the present invention.

In the drawings; Fig. 1 is a diagrammatic sectional view of a fluid pressure brake equipment embodying my invention, the triple valve device of the equipment being shown in release position, and the selector valve device in the position assumed on the rear cars of the train; Fig. 2 is a sectional view of the selector cut-out valve portion of the device, in the hold back position assumed on cars at the front end of the train; Fig. 3 is a sectional view of the selector pilot valve portion of the device, shown in hold back position as assumed on cars at the front end of the train; Fig. 4 is a sectional view of the triple valve device of the equipment shown in quick service position; Fig. 5 is a view similar to Fig. 4, showing the triple valve device in service position; and Fig. 6 is a fragmentary view of the triple valve device and shown in service lap position.

The equipment may comprise a triple valve device 10, a selector cut-out valve device 11, a selector pilot valve device 12, an inshot bulb 13, an auxiliary reservoir 14, a brake pipe 15, a brake cylinder 16, and a quick service reservoir 17.

The triple valve device 10 may comprise a casing 18, which is secured to a pipe bracket 19 and which has a piston chamber 20 and a valve chamber 21 formed therein. The piston chamber 20 is connected, through passages 22 and 23, with the brake pipe 15 and contains a piston 24 which separates piston chamber 20 from the valve chamber 21. The valve chamber 21 is connected through a pipe 25 with the auxiliary reservoir 14 and contains a main slide valve 26 and a graduating slide valve 27 adapted to be operated by the piston 24 through the piston stem 28.

The triple valve device 10 is of the retarded release type, and consequently is provided with a retarded release stop member 29, which is adapted to engage the rear end of piston stem 28 and which is provided with an extended portion 30 adapted to engage the main slide valve 26. A coil spring 31 serves to oppose movement of the stop member 29 under the action of the piston stem 28.

The selector cut-out valve device 11 and the selector pilot valve device 12 are contained in a casing 32 which is secured to the pipe bracket 19. The selector cut-out valve device 11 may comprise a pair of flexible diaphragms 33 and 34 connected together by a stem 35, which is adapted to operate a slide valve 36. The diaphragms 33 and 34 form flexible ends for a valve chamber 37, which is open to the atmosphere through a port 38. The slide valve 36 is yieldably retained upon its seat by a rocking pin 39 which engages the slide valve 36 and is subject to the pressure of a coil spring 40.

The selector pilot valve device 12 may comprise a flexible diaphragm 41 having a stem 42 for operating a slide valve 43. A stop member 44, is subject to the pressure of a coil spring 45 and yieldingly opposes the downward movement of the stem 42.

A chamber 46 at the outer face of the diaphragm 34, of the selector valve device 11, is connected to a passage 47 leading to the valve seat 43, and a chamber 48 at the outer face of the diaphragm 33 is connected to a passage 49, also leading to the seat of the slide valve 43. Chamber 50, at the outer face of diaphragm 41 is connected to the brake pipe 15 through the passage 23, and valve chamber 51 is connected to the auxiliary reservoir 14, through a passage 52 and the pipe 25.

In operation, when the brake pipe 15 is charged with fluid under pressure, if the triple valve piston 24 be in full release position, as shown in Fig. 1, fluid under pressure flows through a feed groove 53 to the valve chamber 21 and then through pipe 25 to the auxiliary reservoir 14. The valve chamber 51 of the selector pilot valve device 12 is charged with fluid under pressure through passage 52, and the chamber 50 is also charged from the brake pipe 15 through passage 23.

If the triple valve piston 24 is in retarded release position, at which time the inner face of the piston abuts a stop 54, the valve chamber 21 and the auxiliary reservoir 14 are charged with fluid under pressure through a more restricted portion 53' of the feed groove 53.

A desirable quick service action heretofore proposed includes means for securing a preliminary quick service by venting fluid from the brake pipe to a bulb upon a movement of the graduating valve of the triple valve device, means for securing a further slow venting of brake pipe pressure upon movement of the main slide valve of the triple valve device, and means for securing a still further venting of brake pipe pressure upon movement of the graduating valve from service lap to service position.

According to my invention, in order to reduce the effect of the above quick service action on cars at the head end of the train, I so control the slow venting of brake pipe pressure to the quick service reservoir 17, upon movement of the main slide valve 26, and the further venting of brake pipe pressure, upon movement of the graduating valve 27, by means of the selector cut-out valve device 11, that these portions of the quick service are cut out on cars at the head end of the train.

Before starting on a run, a service application of the brakes is usually made at the terminal to test and properly adjust the equipment to insure its proper operation. When the brake pipe pressure is reduced to effect a service application of the brakes, the fluid pressure in the chamber 50 of the selector pilot valve device 12 is also reduced, so that on every car, the diaphragm 41 is flexed upwardly by reason of the higher pressure in the valve chamber 51. Now, when the brake pipe pressure is increased to effect a release of the brakes, the rise in brake pipe pressure is transmitted to the several chambers 50 in the selector pilot valve devices 12. On cars at the head end of the train, where the rise in brake pipe pressure is more pronounced, the pressure in the chambers 50 will be sufficient to deflect the diaphragms 41 downwardly to move the slide valve 43 against the resistance of the coil springs 45, to the position shown in Fig. 3. As the pressures in chambers 50 and 51 equalize, that is, when the brake pipe pressure and the auxiliary reservoir pressures reach their normal pressures the coil spring 45 will cause the stem 42 to be raised until the flanged portion of the stop member 44 engages a shoulder to limit its further upward movement, at which time the lost motion between the stem 42 and slide valve 43 will be taken up and, therefore, the slide valve will be retained in its lowermost position. On cars at the rear end of the train, where the rate of increase in brake pipe pressure is slow, the increase in pressure in the chambers 50 is only sufficient to move the stems 42 a distance which will take up the lost motion between the stem 42 and the slide valve 43 and permit the slide valve to remain in its raised position, as shown in Fig. 1, under the influence of the fluid pressure in the valve chamber 51.

On cars at the head end of the train, where the slide valve 43 assumes the position shown in Fig. 3 in releasing the brakes the chamber 48, of the selector valve device 11, is connected to the exhaust port 55, through passage 49 and cavity 54 in the slide valve 43, so that the chamber 48 is at atmospheric pressure. Upon movement of the triple valve device to release position, the brake cylinder 16 is connected, through passages 59, 59' and cavity 58 in the slide valve 26, to a restricted atmospheric exhaust port 61. Passage 57 is also connected to the cavity 58, so that fluid flowing from the brake cylinder through cavity 58 also flows to the chamber 46 of the selector valve device through passage 57, cavity 56 and passage 47. The chamber 46 is thus charged with fluid from the the brake cylinder 16 and the diaphragms 33 and 34 move to the left shifting the slide valve 36 to the position shown in Fig. 2. As the pressure in the brake cylinder is reduced by the flow of fluid through the cavity 58 and restricted atmospheric port 61, the pressure in the chamber 46 will also be reduced but the slide valve 36 will be retained in its shifted position by the frictional resistance of the slide valve to movement as increased by the action of the member 39, which is pressed against the valve 36 by means of spring 40.

On cars at the rear end of the train, where the selector pilot slide valve 43 is retained in the position shown in Fig. 1, in releasing the brakes, the chamber 46 of the selector valve device 11 is connected, through passage 47 and the cavity 54 in the slide valve 43, with the exhaust port 55, so that the chamber 46 is at atmospheric pressure. Upon movement of the triple valve device to release position as described in the preceding paragraph, the chamber 48 of the selector valve device 11 is charged with fluid from the brake cylinder through passages 59, 59', cavity 58, passage 57, cavity 56 and passage 49, so that the diaphragms 33 and 34 are deflected to the right, moving the slide valve 36 to the position shown in Fig. 1, where it is retained under the action of the coil spring 40 as previously described.

It will now be seen that when the train leaves the terminal after the brakes have been applied and released as above set forth, the slide valve 36 of the selector device 11, on the cars at the head end of the train will be in the position shown in Fig. 2, while on the cars at the rear end of the train the slide valve 36 will be in the position shown in Fig. 1. With the selector pilot slide valve 43 in the position shown in Fig. 3, it will be seen that the inshot bulb 13 on the head cars is connected, through a passage 62, with the valve chamber 51, so that the inshot bulb 13 will be charged from said valve chamber with fluid at auxiliary reservoir pressure.

With the parts adjusted as above described, when a gradual reduction in brake pipe pressure is made to effect a service application of the brakes, the triple valve piston 24 first moves to close the feed grooves 53 and 53' and shifts the graduating slide valve 27 relative to the main slide valve 26, so that the parts assume a quick service position, as shown in Fig. 4. With the graduating slide valve 27 in quick service position, fluid under pressure will be vented from the brake pipe 15 to the quick service reservoir 17, through passage 23, passage 63, past a spring urged check valve 64 in the passage 63 to the seat of the slide valve 26, through port 65 in the main slide valve 26, a cavity 66 in the graduating slide valve 27, a port 67 in the main slide valve, through passage 68, past a check valve 69 and through a passage 70. The venting of fluid under presure in this manner produces a sharp and definite local reduction in brake pipe pressure before the triple valve device is moved to service application position. This local reduction in brake pipe pressure is rapidly transmitted to the next car to act in a similar manner and so on through the entire length of the train. As a result, a quick serial service action takes place on each car in advance of application of the brakes on that car.

Upon the initial reduction of brake pipe pressure, the diaphragm 41, which is more sensitive to movement than the triple valve device, will be flexed upwardly, due to the reduction of fluid pressure in the chamber 50, so that the slide valve 43 is shifted to its upper extreme position on all cars of the train. In this position, passage 62, leading to the inshot bulb 13, is connected through cavity 84 in the slide valve 43, with a passage 85, leading to the seat of slide valve 26 and containing a non-return ball check valve 86.

On cars at the head end of the train, the passage 85 is connected, through a cavity 87 in the slide valve 36, with a passage 88, which is connected to the passage 76 which leads to the brake cylinder. By way of these connections, fluid under pressure, contained in the inshot bulb 13, is supplied to the brake cylinder 16 at an unrestricted rate and in sufficient volume to cause the brake piston to move out beyond the usual leakage grooves and so as to cause the brake shoes to engage the wheels. The movement thus effected is insufficient to cause the brake shoes to be applied with force and additional fluid must be supplied to the brake cylinder in a manner to be hereinafter described.

On cars at the rear end of the train, the inshot bulb 13 is ineffective, by reason of the fact that the slide valve 36 of the selector valve device 11 is in the position shown in Fig. 1, and the passage 85 is lapped so that fluid under pressure must be supplied from another source in order to effect movement of the brake cylinder piston.

The triple valve piston continues its movement to service position and in so doing moves the main slide valve 26 to the position shown in Fig. 5 by reason of the fluid pressure in the auxiliary reservoir. The triple valve devices on all of the cars are moved to service position, in which position, a port 71 which was uncovered by the initial movement of the graduating slide valve 27 over the main slide valve 26, registers with the passage 59' in the triple valve device, so that fluid under pressure is supplied from the auxiliary reservoir 14 to the passage 59'.

On cars at the rear end of the train, where the selector slide valve 36 is moved to its extreme right hand position, as shown in Fig. 1, the fluid supplied to the passage 59' passes to the brake cylinder 16 at an unrestricted rate through passages 72 and 73, cavity 74 in the slide valve 36, and passages 75, 76 and 59, to effect a service application of the brakes.

On cars at the front end of the train, however, where the selector slide valve 36 is in its extreme left hand position, as shown in Fig. 2, the fluid supplied to the passage 59' passes to the brake cylinder 16 at a restricted rate through the choke 60' and thence through passage 59, due to the fact that the selector slide valve 36 has lapped the passage 75 to thereby preclude the passage of fluid around the choke 60'. For this reason, the build-up of pressure in the brake cylinders at the front end of the train is retarded to prevent the running in of slack, which would cause a severe shock in the train.

When the main slide valve 26 is moved to service position, a cavity 78 in the main slide valve connects the brake pipe passage 63 with a passage 79, so that fluid will be vented at a slow rate from the brake pipe to the passage 79, through a restricted passage 78' formed in the cavity 78. The passage 79 leads to the seat of the selector slide valve 36 and on cars at the rear end of the train, where the slide valve 36 is in the position shown in Fig. 1, fluid under pressure will be vented from the passage 79, through a cavity 80 in the slide valve 36, passage 68, past the ball check valve 69 and passage 70 to the quick service reservoir 17. On cars at the front end of the train, however, this venting of fluid under pressure is prevented due to the position assumed by the selector slide valve 36, as shown in Fig. 2, where the passage 79 is lapped. Thus it will be understood that this portion of quick service is cut out at the head end of the train so as to prevent the tendency for the brakes to apply too heavily on cars at the head end of the train.

When the auxiliary reservoir pressure has been reduced to a degree slightly less than the reduced brake pipe pressure, the piston 24 moves to the left and shifts the graduating slide valve 27 to service lap position, as shown in Fig. 6, in which position, the supply of fluid to the brake cylinder is cut off.

Upon a further reduction in brake pipe pressure, to effect a reapplication of the brakes at greater pressure, the piston 24 moves from service lap position toward service position, shifting the graduating slide valve 27 relative to the main slide valve 26, which remains in service position. As the graduating slide valve moves toward service position, a port 76, leading from the cavity 66 to the seat of the slide valve, registers with a restricted port 77, leading from the cavity 78 in the main slide valve 26, to permit fluid to be vented at a restricted rate from the brake pipe, at the rear end of the train, to the brake cylinder 16, through passage 63, cavity 78, restricted port 77, port 76, cavity 66, port 65, passage 73, cavity 74, and passages 75, 76 and 59. On cars at the head end of the train, this venting of fluid under pressure from the brake pipe to the brake cylinder is prevented, due to the position of the selector slide valve 36, as shown in Fig. 2, where the passage 73 is lapped. Thus it will be understood that this portion of quick service venting of fluid from the brake pipe is also cut out at the head end of the train, so as to prevent the tendency to apply the brakes too heavily at the head end of the train.

While the movement of the parts of the triple valve device is identical throughout the entire length of the train, the position assumed by the selector valve device 11, as shown in Fig. 2, at the head end of the train, is such that the slide valve 36 is in a lap position so as to preclude the venting of fluid under pressure from the brake pipe to the quick service reservoir 17, when the main slide valve 26 is in service position, and also prevent the venting of fluid from the brake pipe to the brake cylinder when the graduating slide valve 27 is moved from service lap to service position upon a reapplication of the brakes.

To effect a release of the brakes, the brake pipe pressure is increased in the usual manner and the triple valve piston 24 and slide valves 26 and 27 are moved to release position, as shown in Fig. 1. In this position the brake cylinder 16 is vented to the atmosphere by way of passage 59, past check valve 60, passage 59', cavity 58 and the atmospheric passage 61, to release the brakes in the usual manner.

From the foregoing description, it will readily be seen that an improved brake equipment has been provided, which will insure a prompt reduction of brake pipe pressure throughout the entire length of the train upon initiating an application of the brakes, and incorporating means effective to delay the build-up of brake cylinder pressure at the head end of the train, by eliminating the venting of brake pipe pressure to the quick service reservoir at the head end of the train upon movement of the triple valve device to service position, and also eliminating the venting of the brake pipe pressure to the brake cylinder at the head end of the train upon a reapplication of the brakes.

While the invention has been described in considerable detail in the foregoing specification, it is understood that various changes may be made in its embodiment without departing from or sacrificing any of the advantages hereinafter claimed.

Having now described my invention, what I claim as new and desire to secure by Letters Patent, is:

1. In a fluid pressure brake, the combination with a brake pipe, of a triple valve device operated upon a reduction in brake pipe pressure for effecting a service application of the brakes, means operative upon movement of said triple valve device in effecting a service application of the brakes for venting fluid from the brake pipe to effect local quick service action, and valve means operative upon an increase in brake pipe pressure for rendering said means inoperative to vent fluid from the brake pipe.

2. In a fluid pressure brake system for a train of cars, the combination with a brake pipe, of a valve device on each car of the train operating upon a reduction in brake pipe pressure for effecting a service application of the brakes, means operative upon movement of said valve device to effect a service application of the brakes for venting fluid from the brake pipe to cause a local reduction in brake pipe pressure, and means for preventing the first mentioned means from operating on cars at the head end of the train.

3. In a fluid pressure brake system for a train of cars, the combination with a brake pipe, of a brake controlling valve device on each car of the train operative upon a reduction in brake pipe pressure for effecting a service application of the brakes, means for locally venting fluid from the brake pipe upon initial movement of said valve device to effect a service application of the brakes and for further venting fluid from the brake pipe upon a further movement of said valve device, and means for preventing said further venting of fluid from the brake pipe on cars at the head end of the train.

4. A triple valve device comprising a main valve, a graduating valve and a piston operated upon a reduction in brake pipe pressure for operating said valves to effect a service application of the brakes, means operative upon the initial movement of the graduating valve by said piston relative to the main valve for venting fluid from the brake pipe, and operative upon movement of the main valve for further venting fluid from the brake pipe, and means operative on cars at the head end of the train for preventing said further venting of fluid from the brake pipe.

5. A triple valve device comprising a main valve, a graduating valve and a piston operated upon a reduction in brake pipe pressure for operating said valves to effect a service application of the brakes, means operative upon the initial movement of the graduating valve by said piston relative to the main valve for venting fluid from the brake pipe, and operative upon movement of the main valve for further venting fluid from the brake pipe, and means conditioned upon an increase in brake pipe pressure exceeding a predetermined rate for preventing said further venting of fluid from the brake pipe when a service application of the brakes is effected.

6. In a fluid pressure brake system for a train of cars, the combination with a brake pipe, and a quick service reservoir, of a triple valve device on each car of the train operating upon a reduction in brake pipe pressure for effecting a service application of the brakes, means for locally venting fluid from said brake pipe to said quick service reservoir upon initial movement of said triple valve device to effect a service application of the brakes and for further venting fluid from said brake pipe to said quick service reservoir upon further movement of said triple valve device, and a selector valve device under the influence of brake pipe pressure for controlling said further venting of fluid under pressure from said brake pipe to said quick service reservoir.

7. In a fluid pressure brake system for a train of cars, the combination with a brake pipe, and a quick service reservoir, of a triple valve device on each car of the train operating upon a reduction in brake pipe pressure for effecting a service application of the brakes, means for locally venting fluid from said brake pipe to said quick service reservoir upon initial movement of said triple valve device to effect a service application of the brakes and for further venting fluid from said brake pipe to said quick service reservoir upon further movement of said triple valve device, and a selector valve device under the influence of brake pipe pressure for controlling said further venting of fluid under pressure from said brake pipe to said quick service reservoir, said selector valve device being operable to cut off the flow of fluid under pressure from said brake pipe to said brake cylinder on cars at the head end of the train to retard the build-up of brake cylinder pressure.

8. In a fluid pressure brake system for a train of cars, the combination with a brake pipe, a brake cylinder, a quick service reservoir, and an auxiliary reservoir, of a triple valve device operated upon a reduction in brake pipe pressure to effect a service application of the brakes, means operative upon the initial movement of the triple valve device for venting fluid under pressure from said brake pipe to said quick service reservoir to effect a quick service action throughout the train, and operative upon continued movement of the triple valve device to service position for further venting of fluid under pressure from said brake pipe to said quick service reservoir, said triple valve device being movable to service lap position upon reduction of auxiliary reservoir pressure to cut off the supply of fluid under pressure from said auxiliary reservoir to said brake cylinder, said triple valve device being movable upon a reapplication of the brakes from service lap position to service position, during which traverse fluid is vented from said brake pipe to said brake cylinder, and a selector valve device under the influence of brake pipe pressure operable to cut off said venting of fluid under pressure from said brake pipe to said quick service reservoir and from said brake pipe to said brake cylinder on cars at the head end of the train for retarding the build-up of brake cylinder pressure.

9. In a fluid pressure brake system for a train of cars, the combination with a brake pipe, a brake cylinder, a quick service reservoir, and an auxiliary reservoir, of a triple valve device operated upon a reduction in brake pipe pressure to effect a service application of the brakes, means operative upon the initial movement of the triple valve device for venting fluid under pressure from said brake pipe to said quick service reservoir to effect a quick service action throughout the train, and operative upon continued movement of the triple valve device to service position for further venting of fluid under pressure from said brake pipe to said quick service reservoir, said triple valve device being movable to service lap position upon reduction of auxiliary reservoir pressure to cut off the supply of fluid under pressure from said auxiliary reservoir to said brake cylinder, said triple valve device being movable upon a reapplication of the brakes from service lap position to service position, during which traverse fluid is vented from said brake pipe to said brake cylinder, and a selector valve device operatively positioned upon an increase in brake pipe pressure exceeding a predetermined rate for preventing the venting of fluid under pressure from said brake pipe to said quick service reservoir and from said brake pipe to said brake cylinder on cars at the head end of the train for retarding the build-up of brake cylinder pressure.

In testimony whereof I have hereunto set my hand, this 11th day of November, 1931.

CLYDE C. FARMER.